United States Patent
Yadav et al.

(10) Patent No.: US 9,755,965 B1
(45) Date of Patent: Sep. 5, 2017

(54) FORWARDING TABLES FOR VIRTUAL NETWORKING DEVICES

(71) Applicant: Cisco Technology, Inc., San Jose, CA (US)

(72) Inventors: Navindra Yadav, Sunnyvale, CA (US); Sameer Merchant, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 94 days.

(21) Appl. No.: 14/477,817

(22) Filed: Sep. 4, 2014

Related U.S. Application Data

(60) Provisional application No. 61/900,372, filed on Nov. 5, 2013.

(51) Int. Cl.
| | | |
|---|---|---|
| *H04L 12/54* | (2013.01) | |
| *H04L 12/741* | (2013.01) | |
| *H04L 12/713* | (2013.01) | |

(52) U.S. Cl.
CPC .......... *H04L 45/54* (2013.01); *H04L 45/586* (2013.01)

(58) Field of Classification Search
CPC ..... H04L 41/00; H04L 12/4699; H04L 12/24; H04L 45/745; H04L 12/28; H04L 12/713; H04L 12/741; H04L 45/54; H04L 45/586; H04L 45/74; H04L 49/05; G06F 9/50; G06F 9/5027; G06F 9/45558

USPC ............ 370/351–356, 386, 388, 389, 390, 370/391.392, 395.1, 396, 397, 398, 399, 370/395.31, 395.52, 395.53, 400, 370/426–429; 700/203–207, 220–226

See application file for complete search history.

(56) References Cited

U.S. PATENT DOCUMENTS

| | | | | |
|---|---|---|---|---|
| 6,907,039 | B2* | 6/2005 | Shen | H04L 12/4679 370/400 |
| 7,630,368 | B2* | 12/2009 | Tripathi | H04L 45/00 370/389 |
| 2014/0056298 | A1* | 2/2014 | Vobbilisetty | H04L 12/46 370/355 |
| 2014/0241353 | A1* | 8/2014 | Zhang | H04L 45/74 370/390 |
| 2014/0372582 | A1* | 12/2014 | Ghanwani | H04L 45/64 709/223 |

* cited by examiner

*Primary Examiner* — Hanh N Nguyen
(74) *Attorney, Agent, or Firm* — Polsinelli PC

(57) ABSTRACT

Systems, methods, and non-transitory computer-readable storage media for forwarding tables for virtual networking devices. The system first identifies local virtual machines hosted on a local host connected to the system, the system having virtual tunneling capabilities. The system then generates a forwarding table for the system. Next, the system populates the forwarding table with local entries including bindings for the local virtual machines hosted on the local host and adds a default route in the forwarding table pointing to a default forwarder function, wherein the default route is configured to handle all non-local traffic relative to the system and the local host.

20 Claims, 7 Drawing Sheets

FORWARDING TABLE
502

- CA: VM A, 10.0.0.5 → PA 192.168.1.11(Host 1), VNID (1), Decapsulate, Routing Domain (1)

- CA: VM B, 10.0.0.5 → PA 192.168.1.11(Host 1), VNID (2), Decapsulate, Routing Domain (2)

- CA: VM C, 10.0.0.7 → PA 192.168.1.11(Host 1), VNID (3), Decapsulate, Routing Domain (1)

- CA: VM D, 10.0.0.7 → PA 192.168.1.11(Host 1), VNID (2), Decapsulate, Routing Domain (2)

- *, * → PA 192.168.1.4 (Fabric), VNID (Preserve Ingress VNID), Encapsulate, Routing Domain (1)

FIG. 6

FORWARDING TABLES FOR VIRTUAL NETWORKING DEVICES

TECHNICAL FIELD

The present technology pertains to forwarding tables, and more specifically pertains to forwarding tables for distributed virtual networking devices.

BACKGROUND

The soaring demand for network data throughout the globe has steadily fueled the evolution of networking technologies, as engineers and manufacturers rush to keep pace with the changing data consumption landscape and increasing network scalability requirements. Various network technologies have been developed precisely to meet this soaring demand for network data. For example, overlay network solutions, such as virtual extensible local area networks (VXLANs), as well as virtualization and cloud computing technologies, have been widely implemented in networks with increasing success as popular solutions to such growing demands for network data.

However, while this advancement in network technologies has allowed networks to support such increased demand for network data, it has also resulted in larger and more complex networks, involving massive amounts of traffic data constantly being routed through the network. And as the amount of traffic handled by the network grows, it becomes increasingly important to ensure efficient and error-free routing strategies. Precisely, poor routing strategies can create an enormous burden on the network, which only worsens as the amount of traffic grows, and can result in inefficient and costly traffic routing, as well as routing errors, such as route flaps and network loops. To this end, forwarding tables are typically implemented in networks to ensure that networking devices, such as routers and switches, can properly route traffic through the network. Unfortunately, as the complexity of the network grows, it becomes increasingly difficult to manage and maintain accurate and effective forwarding tables, particularly as virtual networks and devices are integrated into the network.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 6 illustrates an example forwarding table implementing a default forwarding function scheme.

DESCRIPTION OF EXAMPLE EMBODIMENTS

Figure 1:
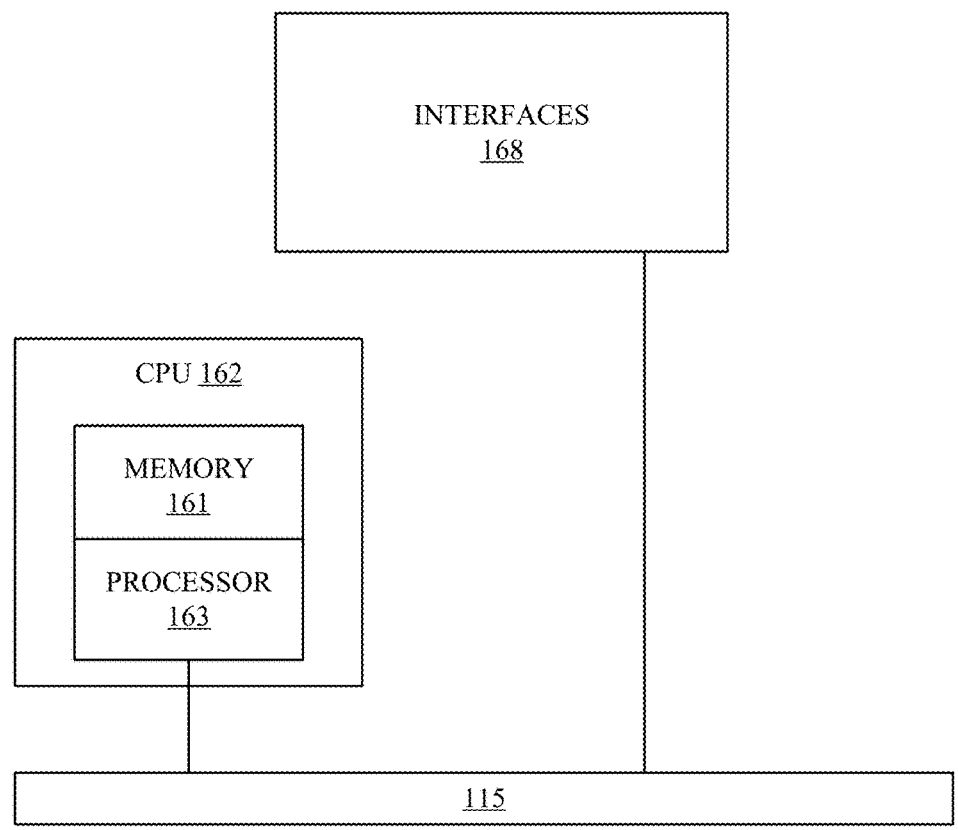
FIG. 1 illustrates an example network device according to some aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Data centers and networks are increasingly being built using virtual machines (VMs), virtual switches and routers, and physical networking devices with virtualization capabilities, such as virtual tunnel endpoints, in order to increase the size and capabilities of the network(s) by adding devices and virtual workloads using virtualization (e.g., overlay networks). Such virtualization devices often stack inside a hypervisor to forward packets inside of the host machine, or across host machines by leveraging an overlay network technology, such as virtual extensible LAN (VXLAN) technology. However, the forwarding tables on these devices are increasingly becoming larger and more complicated over time. For example, these devices typically maintain a forwarding table which includes reachability information, such as tenant, VM network, or VM, for all of the VMs in the network, including VMs across multiple hosts in an overlay network. This binding information is sometimes referred to as a directory.

Such directory, however, can become extremely large and complicated, and the sharing of information for populating the various directories often saturates the network(s). One of the reasons a complete directory is maintained across devices is to prevent flooding of unknown traffic inside the data center. However, pushing this directory information, as previously suggested, can be an expensive operation in the control plane and may limit the size of the network.

The approaches set forth herein, on the other hand, can provide a forwarding scheme which eliminates many of these disadvantages of conventional schemes. In particular, the forwarding scheme allows forwarding tables on devices to be limited in size and complexity, without requiring extensive amounts of information to be pushed through the network or limiting the size of the network. In addition, the forwarding scheme can be implemented in a simplified and effective manner, while retaining the benefits of no flooding, and all other benefits of maintaining a complete forwarding table as is done in conventional schemes.

Disclosed are systems, methods, and computer-readable storage media for forwarding tables for virtual networking devices. Here, a networking device first identifies virtual machines hosted on a local host connected to the networking device, where the networking device is a virtual tunnel endpoint associated with an overlay network. In some cases, the networking device is a virtual switch or virtual router. In other cases, the networking device is a physical switch with virtual tunnel endpoint functionalities.

The virtual machines can reside on one or more segments of the overlay network, such as VNIDs or VLANs. In some cases, the overlay network can be a VXLAN network. However, in other cases, the overlay network can be based on any other overlay protocol, such as NVGRE or STT, for example. The local host can be a server connected to the networking device and running the virtual machines. For example, the local host can be a server running a hypervisor with one or more virtual machines. Here, the virtual machines can reside on the overlay network.

In identifying the virtual machines, the networking device can obtain any of the routing information of the virtual machines, which can include, for example, the IP address of the virtual machines, the IP address of the local host, the MAC address of the local host, the network and/or network segment identifier (ID), a routing domain ID, etc. In some cases, the networking device can also compare routing information collected with its own configured networking information, such as subnet, IP address, network segment, routing domain, etc., to determine if the routing information should be treated as local for purposes of the forwarding policy, as described below.

Next, the networking device generates a forwarding table (702). The forwarding table can be a lookup table used by the networking device to route or forward packets it receives. To this end, the networking device can use the forwarding table to determine where to send an incoming packet it receives. In other words, the forwarding table can help the system 110 identify the next hop for the packet. Accordingly, the forwarding table can have hop information and mappings or bindings.

The networking device then populates the forwarding table with local entries including bindings for the virtual machines hosted on the local host and adds a default route in the forwarding table pointing to a default forwarder function configured to handle all non-local traffic relative to the networking device and the local host. The default forwarder function can be implemented on any network, including a network separate from the overlay network, such as the overlay-aware network fabric. Thus, the networking device can include all of the local entries in the forwarding table and a default route for all other traffic. This way the networking device can maintain a smaller and less complex forwarding table, by limiting the table to local entries and a "catch all" or default route for all other addresses and devices.

DESCRIPTION

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments; networks; devices; ports; physical or logical links; and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc.

Cloud computing resources may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

The disclosed technology addresses the need in the art for accurate and efficient routing schemes. Disclosed are systems, methods, and computer-readable storage media for forwarding tables for virtual networking devices. A brief introductory description of example systems and networks, as illustrated in FIGS. 1 through 4, is disclosed herein. A detailed description of a forwarding scheme, default forwarding scheme or function, related concepts, and example variations, will then follow. These variations shall be described herein as the various embodiments are set forth. The disclosure now turns to FIG. 1.

FIG. 1 illustrates an example network device 110 suitable for implementing the present invention. Network device 110 includes a master central processing unit (CPU) 162, interfaces 168, and a bus 115 (e.g., a PCI bus). When acting under the control of appropriate software or firmware, the CPU 162 is responsible for executing packet management, error detection, and/or routing functions, such as miscabling detection functions, for example. The CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of router 110. In a specific embodiment, a memory 161 (such as non-volatile RAM and/or ROM) also forms part of CPU 162. However, there are many different ways in which memory could be coupled to the system.

The interfaces 168 are typically provided as interface cards (sometimes referred to as "line cards"). Generally, they control the sending and receiving of data packets over the network and sometimes support other peripherals used with the router 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 162 to efficiently perform routing computations, network diagnostics, security functions, etc.

Although the system shown in FIG. 1 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 2B:
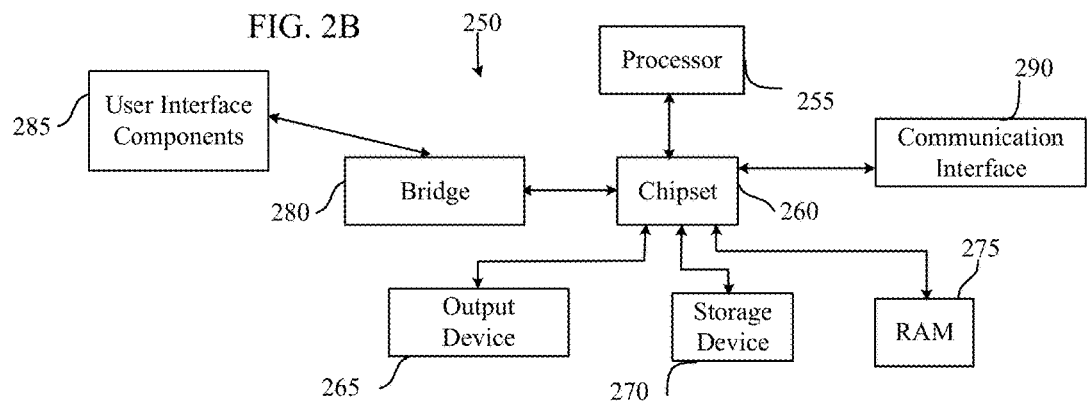
FIGS. 2A and 2B illustrate example system embodiments according to some aspects of the subject technology.
Figure 2A:
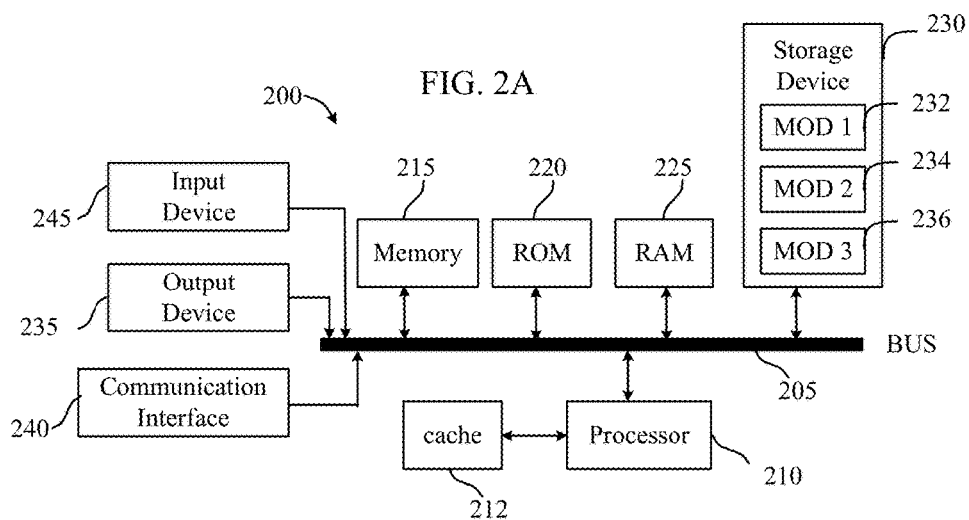

FIG. 2A, and FIG. 2B illustrate example system embodiments. The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using a bus 205. Exemplary system 200 includes a processing unit (CPU or processor) 210 and a system bus 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 232, module 2 234, and module 3 236 stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

To enable user interaction with the computing device 200, an input device 245 can represent any number of input mechanisms, such as a microphone for speech, a touch-sensitive screen for gesture or graphical input, keyboard, mouse, motion input, speech and so forth. An output device 235 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, display 235, and so forth, to carry out the function.

FIG. 2B illustrates an example computer system 250 having a chipset architecture that can be used in executing the described method and generating and displaying a graphical user interface (GUI). Computer system 250 is an example of computer hardware, software, and firmware that can be used to implement the disclosed technology. System 250 can include a processor 255, representative of any number of physically and/or logically distinct resources capable of executing software, firmware, and hardware configured to perform identified computations. Processor 255 can communicate with a chipset 260 that can control input to and output from processor 255. In this example, chipset 260 outputs information to output 265, such as a display, and can read and write information to storage device 270, which can include magnetic media, and solid state media, for example. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or 275. Further, the machine can receive inputs from a user via user interface components 285 and execute appropriate functions, such as browsing functions by interpreting these inputs using processor 255.

It can be appreciated that example systems 200 and 250 can have more than one processor 210 or be part of a group or cluster of computing devices networked together to provide greater processing capability.

Figure 3:
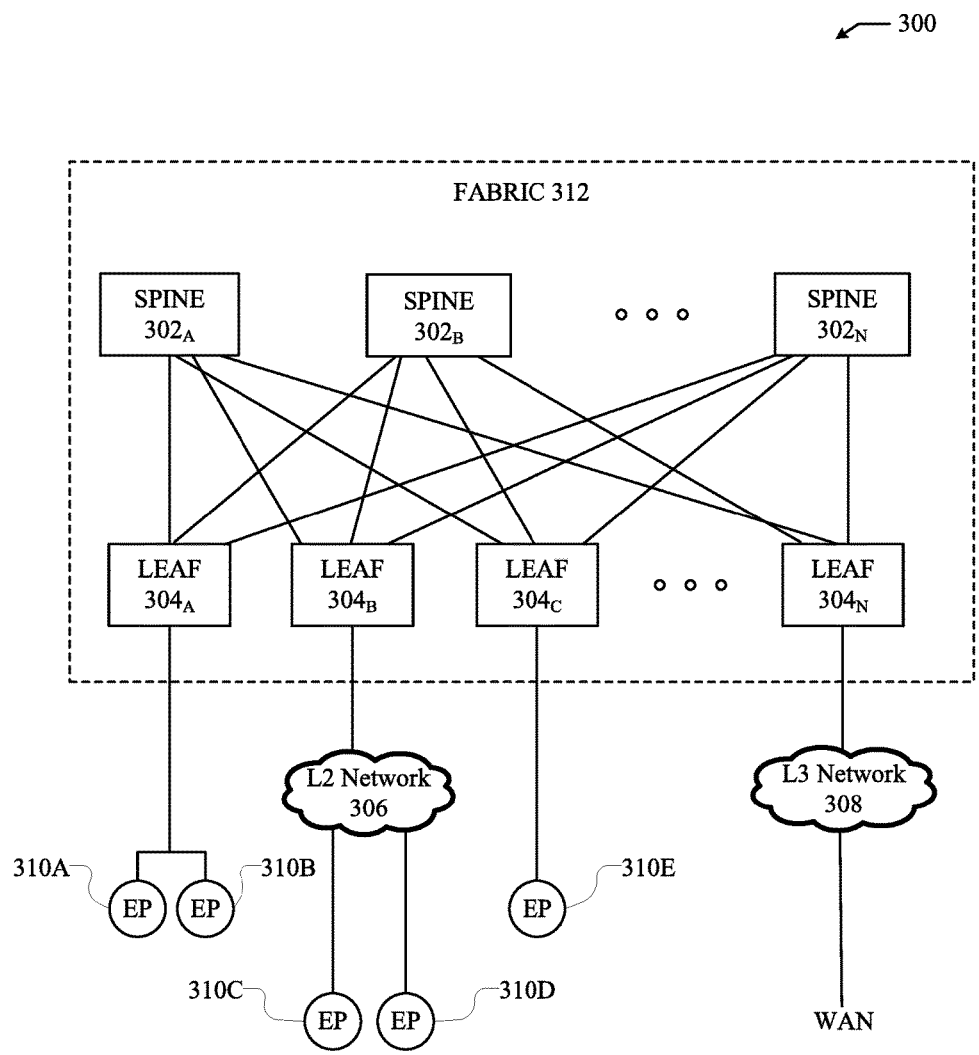
FIG. 3 illustrates a schematic block diagram of an example architecture for a network fabric.

FIG. 3 illustrates a schematic block diagram of an example architecture 300 for a network fabric 312. The network fabric 312 can include spine switches $302_A$, $302_B$, ..., $302_N$ (collectively "302") connected to leaf switches $304_A$, $304_B$, $304_C$, ..., $304_N$ (collectively "304") in the network fabric 312.

Spine switches 302 can be L3 switches in the fabric 312. However, in some cases, the spine switches 302 can also, or otherwise, perform L2 functionalities. Further, the spine switches 302 can support various capabilities, such as 40 or 10 Gbps Ethernet speeds. To this end, the spine switches 302 can include one or more 40 Gigabit Ethernet ports. Each port can also be split to support other speeds. For example, a 40 Gigabit Ethernet port can be split into four 10 Gigabit Ethernet ports.

In some embodiments, one or more of the spine switches 302 can be configured to host a proxy function that performs a lookup of the endpoint address identifier to locator mapping in a mapping database on behalf of leaf switches 304 that do not have such mapping. The proxy function can do this by parsing through the packet to the encapsulated, tenant packet to get to the destination locator address of the tenant. The spine switches 302 can then perform a lookup of their local mapping database to determine the correct locator address of the packet and forward the packet to the locator address without changing certain fields in the header of the packet.

When a packet is received at a spine switch $302_i$, the spine switch $302_i$ can first check if the destination locator address is a proxy address. If so, the spine switch $302_i$ can perform the proxy function as previously mentioned. If not, the spine switch $302_i$ can lookup the locator in its forwarding table and forward the packet accordingly.

Spine switches 302 connect to leaf switches 304 in the fabric 312. Leaf switches 304 can include access ports (or non-fabric ports) and fabric ports. Fabric ports can provide uplinks to the spine switches 302, while access ports can provide connectivity for devices, hosts, endpoints, VMs, or external networks to the fabric 312.

Leaf switches 304 can reside at the edge of the fabric 312, and can thus represent the physical network edge. In some cases, the leaf switches 304 can be top-of-rack ("ToR") switches configured according to a ToR architecture. In other cases, the leaf switches 304 can be aggregation switches in any particular topology, such as end-of-row (EoR) or middle-of-row (MoR) topologies. The leaf switches 304 can also represent aggregation switches, for example.

The leaf switches 304 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 304 can contain virtual switching functionalities, such as a virtual tunnel endpoint (VTEP) function as explained below in the discussion of VTEP 408 in FIG. 4. To this end, leaf switches 304 can connect the fabric 312 to an overlay network, such as overlay network 400 illustrated in FIG. 4.

Network connectivity in the fabric 312 can flow through the leaf switches 304. Here, the leaf switches 304 can provide servers, resources, endpoints, external networks, or VMs access to the fabric 312, and can connect the leaf switches 304 to each other. In some cases, the leaf switches 304 can connect EPGs to the fabric 312 and/or any external networks. Each EPG can connect to the fabric 312 via one of the leaf switches 304, for example.

Endpoints 310A-E (collectively "310") can connect to the fabric 312 via leaf switches 304. For example, endpoints 310A and 310B can connect directly to leaf switch 304A, which can connect endpoints 310A and 310B to the fabric 312 and/or any other one of the leaf switches 304. Similarly, endpoint 310E can connect directly to leaf switch 304C, which can connect endpoint 310E to the fabric 312 and/or any other of the leaf switches 304. On the other hand, endpoints 310C and 310D can connect to leaf switch 304B via L2 network 306. Similarly, the wide area network (WAN) can connect to the leaf switches 304C or 304D via L3 network 308.

Endpoints 310 can include any communication device, such as a computer, a server, a switch, a router, etc. In some cases, the endpoints 310 can include a server, hypervisor, or switch configured with a VTEP functionality which connects an overlay network, such as overlay network 400 below, with the fabric 312. For example, in some cases, the endpoints 310 can represent one or more of the VTEPs 408A-D illustrated in FIG. 4. Here, the VTEPs 408A-D can connect to the fabric 312 via the leaf switches 304. The overlay network can host physical devices, such as servers, applications, EPGs, virtual segments, virtual workloads, etc. In addition, the endpoints 310 can host virtual workload(s), clusters, and applications or services, which can connect with the fabric 312 or any other device or network, including an external network. For example, one or more endpoints 310 can host, or connect to, a cluster of load balancers or an EPG of various applications.

Although the fabric 312 is illustrated and described herein as an example leaf-spine architecture, one of ordinary skill in the art will readily recognize that the subject technology can be implemented based on any network fabric, including any data center or cloud network fabric. Indeed, other architectures, designs, infrastructures, and variations are contemplated herein.

Figure 4:
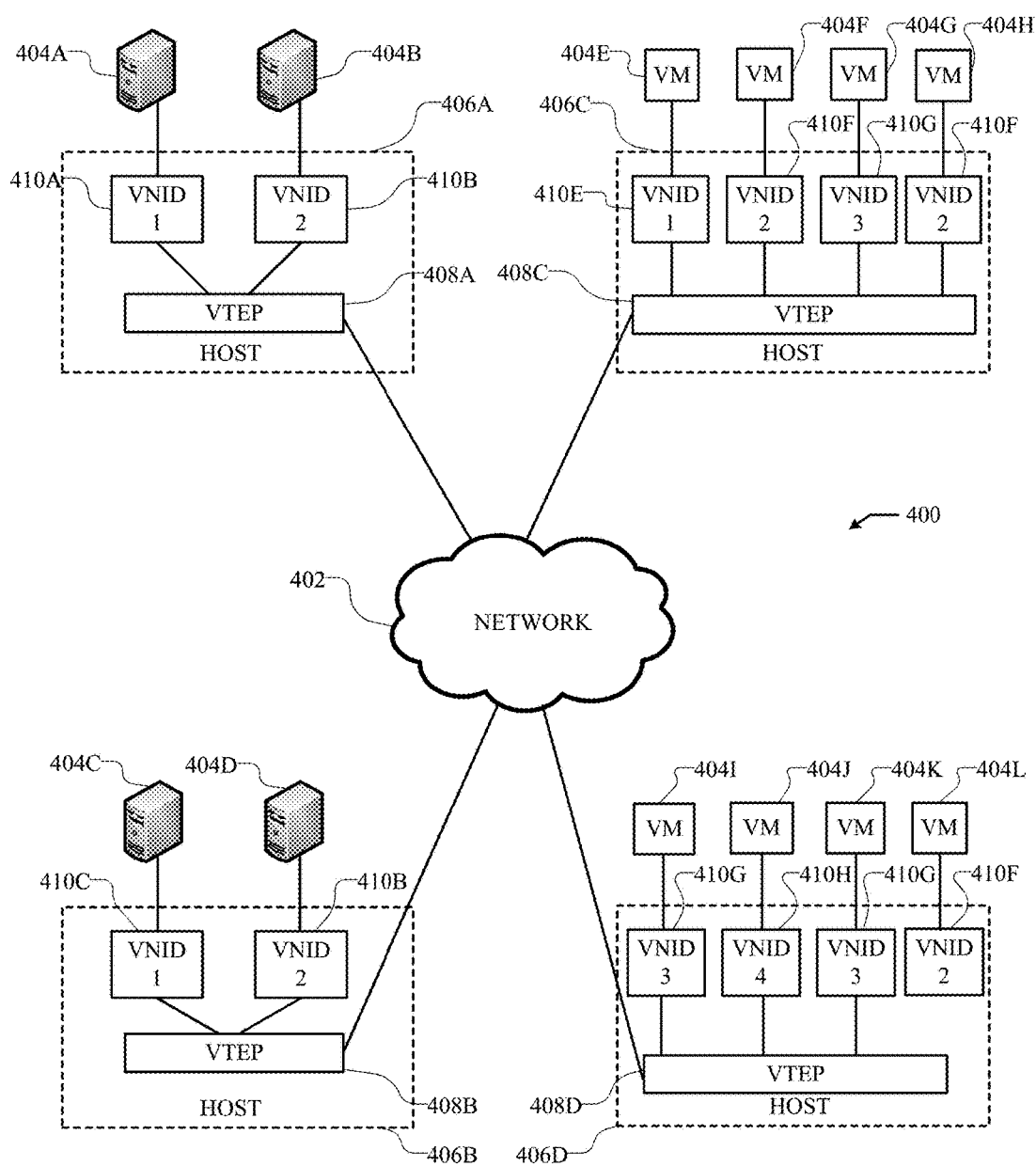
FIG. 4 illustrates an example overlay network.

FIG. 4 illustrates an exemplary overlay network 400. Overlay network 400 uses an overlay protocol, such as VXLAN, VGRE, VO3, or STT, to encapsulate traffic in L2 and/or L3 packets which can cross overlay L3 boundaries in the network. As illustrated in FIG. 4, overlay network 400 can include hosts 406A-D interconnected via network 402.

Network 402 can include a packet network, such as an IP network, for example. Moreover, network 402 can connect the overlay network 400 with the fabric 312 in FIG. 3. For example, VTEPs 408A-D can connect with the leaf switches 304 in the fabric 312 via network 402.

Hosts 406A-D include virtual tunnel end points (VTEP) 408A-D, which can be virtual nodes or switches configured to encapsulate and de-encapsulate data traffic according to a specific overlay protocol of the network 400, for the various virtual network identifiers (VNIDs) 410A-D. Moreover, hosts 406A-D can include servers containing a VTEP functionality, hypervisors, and physical switches, such as L3 switches, configured with a VTEP functionality. For example, hosts 406A and 406B can be physical switches configured to run VTEPs 408A-B. Here, hosts 406A and 406B can be connected to servers 404A-D, which, in some cases, can include virtual workloads through VMs loaded on the servers, for example.

In some embodiments, network 400 can be a VXLAN network, and VTEPs 408A-D can be VXLAN tunnel end points. However, as one of ordinary skill in the art will readily recognize, network 400 can represent any type of overlay or software-defined network, such as NVGRE, STT, or even overlay technologies yet to be invented.

The VNIDs can represent the segregated virtual networks in overlay network 400. Each of the overlay tunnels (VTEPs 408A-D) can include one or more VNIDs. For example, VTEP 408A can connect to virtual or physical devices or workloads residing in VNIDs 1 and 2; VTEP 408B can connect to virtual or physical devices or workloads residing in VNIDs 1 and 3, VTEP 408C can connect to virtual or physical devices or workloads residing in VNIDs 1, 2, 3, and another instance of VNID 2; and VTEP 408D can connect to virtual or physical devices or workloads residing in VNIDs 3 and 4, as well as separate instances of VNIDs 2 and 3. As one of ordinary skill in the art will readily recognize, any particular VTEP can, in other embodiments, have numerous VNIDs, including more than the 4 VNIDs illustrated in FIG. 4. Moreover, any particular VTEP can connect to physical or virtual devices or workloads residing in one or more VNIDs.

The traffic in overlay network 400 can be segregated logically according to specific VNIDs. This way, traffic intended for VNID 1 can be accessed by devices residing in VNID 1, while other devices residing in other VNIDs (e.g., VNIDs 2, 3, and 4) can be prevented from accessing such traffic. In other words, devices or endpoints in specific VNIDs can communicate with other devices or endpoints in the same specific VNIDs, while traffic from separate VNIDs can be isolated to prevent devices or endpoints in other specific VNIDs from accessing traffic in different VNIDs.

Each of the servers 404A-D and VMs 404E-L can be associated with a respective VNID or virtual segment, and communicate with other servers or VMs residing in the same VNID or virtual segment. For example, server 404A can communicate with server 404C and VM 404E because they all reside in the same VNID, viz., VNID 1. Similarly, server 404B can communicate with VMs 404F, 404H, and 404L because they all reside in VNID 2.

Each of the servers 404A-D and VMs 404E-L can represent a single server or VM, but can also represent multiple servers or VMs, such as a cluster of servers or VMs. Moreover, VMs 404E-L can host virtual workloads, which can include application workloads, resources, and services, for example. On the other hand, servers 404A-D can host local workloads on a local storage and/or a remote storage, such as a remote database. However, in some cases, servers 404A-D can similarly host virtual workloads through VMs residing on the servers 404A-D.

VTEPs 408A-D can encapsulate packets directed at the various VNIDs 1-4 in the overlay network 400 according to the specific overlay protocol implemented, such as VXLAN, so traffic can be properly transmitted to the correct VNID and recipient(s) (i.e., server or VM). Moreover, when a switch, router, or other network device receives a packet to be transmitted to a recipient in the overlay network 400, it can analyze a routing table, such as a lookup table, to determine where such packet needs to be transmitted so the traffic reaches the appropriate recipient. For example, if VTEP 408A receives a packet from endpoint 404B that is intended for endpoint 404H, VTEP 408A can analyze a routing table that maps the intended endpoint, endpoint 404H, to a specific switch that is configured to handle communications intended for endpoint 404H. VTEP 408A might not initially know, when it receives the packet from endpoint 404B, that such packet should be transmitted to VTEP 408C in order to reach endpoint 404H. Accordingly, by analyzing the routing table, VTEP 408A can lookup endpoint 404H, which is the intended recipient, and determine that the packet should be transmitted to VTEP 408C, as specified in the routing table based on endpoint-to-switch mappings or bindings, so the packet can be transmitted to, and received by, endpoint 404H as expected.

Each VTEP 408A-D typically maintains a forwarding table containing an entry for all the endpoints (i.e., servers and VMs) in the network 400, or at least those entries the VTEP knows about. However, as the network grows and becomes more complicated, so too does the forwarding table. Indeed, the forwarding table can become extremely large and complicated in larger and more complex environments. This can be computationally expensive for the various switches and routers, and may require large amounts of memory and storage to hold and process such forwarding tables.

As new devices are added to the network 400, the VTEPs attached to the devices or residing in the network of the devices learn of the new devices and update the forwarding table. The updated forwarding table then is converged so all the VTEPs 408A-D can update their forwarding tables and maintain an accurate account of the network.

To avoid large and complex routing tables, each of the VTEPs 408A-D can maintain a simplified forwarding table which includes every local entry, including an entry for every VM and/or server connected to the VTEP. Here, each entry can include a respective address associated with the entry, as well as a scope ID, such as a VLAN ID, a VNID, a VRF ID, a subnet, a VPN ID, etc. The next hop forwarding information along with an entry can be set to point to the local host.

A "catch all" entry or default route can then be added to the forwarding table to handle any other traffic, including any miss in the forwarding table. The "catch all" entry or default route can point to a default forwarder function, such that any traffic addressed to a destination address that is not a local address and is therefore not included in the forwarding table of the relevant VTEP, can be forwarded to the address of the default forwarder function represented by the default route (i.e., the "catch all" entry). The default forwarder function can then receive the miss traffic, which would be forwarded from the local, specific VTEP to the default forwarder function, and forward or route the traffic towards its appropriate destination. This way, the forwarding table at each VTEP can be kept smaller and much simpler, without any negative performance consequences.

The default forwarder function can be implemented in a standalone or distributed fashion. In some embodiments, the default forwarder function can be implemented on leaf and spine switches in the network fabric, such as leaf and spine switches 304 and 302, respectively, on the network fabric 312. In some cases, the leaf and spine switches 304 and 302 can glean the reachability information, such as VM-to-host reachability information, by learning this information from the data plane of the fabric 312, or using a scalable control plane, for example.

This forwarding solution can be implemented as a scalable router and switch solution on top of a overlay-aware fabric, such as fabric 312. Unlike conventional solutions, where every binding update is pushed to every host or hypervisor, the scheme herein can work by limiting binding updates to only those impacted hosts or hypervisors. These can mean that a binding update is only needed to be pushed to a single hypervisor, except during a VM migration which may require up to two hypervisors. In some embodiments, the binding update does not need to be explicitly pushed to the impacted hypervisor. Rather, when the VM is created or 'unstunned', the hypervisor can automatically install the forwarding policy or scheme.

As one of ordinary skill in the art will readily recognize, the examples and technologies provided above are simply for clarity and explanation purposes, and can include many additional concepts and variations.

Figure 5:
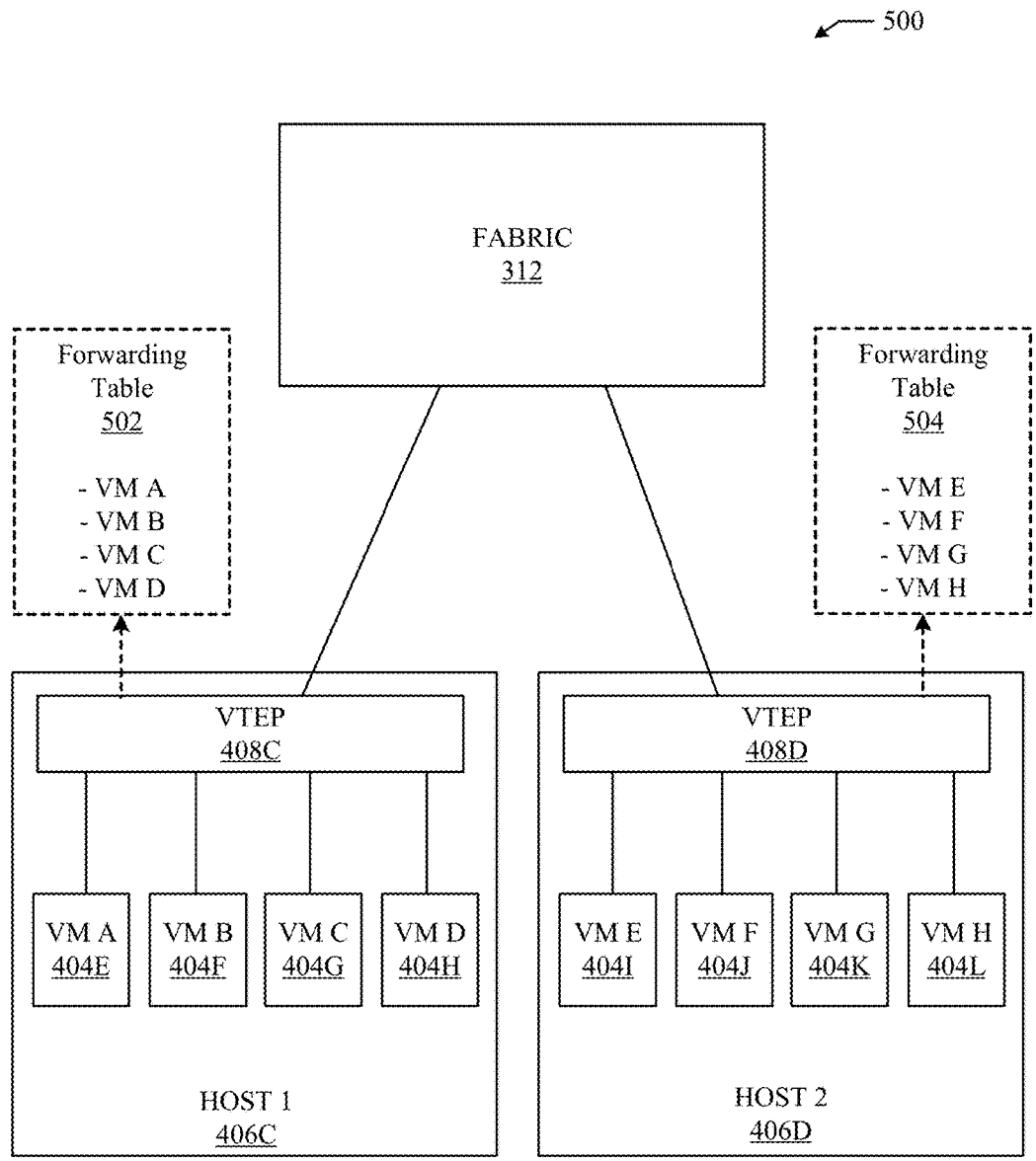
FIG. 5 illustrates a schematic block diagram of an example implementation of a forwarding policy according to one embodiment.

FIG. 5 illustrates a schematic block diagram of an example implementation 500 of a forwarding policy according to one embodiment. Host 1 (406C) and host 2 (406D) connect to the fabric 312 via respective VTEPs 408C and 408D. Hosts 1 and 2 can be servers hosting virtual workloads, VMs 404E-404L, residing in an overlay network, such as overlay network 400, which connects to the fabric 312 via a virtual tunnel through the VTEPs 408C and 408D. In some cases, however, hosts 1 and 2 can also connect to other servers on the overlay network, which can host one or more virtual or local workloads.

VTEPs 408C and 408D can be virtual switch or virtual routers configured to connect the fabric 312 to an overlay network, such as overlay 400, through a virtual tunnel, using VTEP functionality. However, in some cases, VTEPs 408C and/or 408D can be physical switches or routers configured to implement VTEP functionality to connect the fabric 312 to an overlay network. For example, VTEPs 408C and/or 408D can be ToR or leaf switches, such as leaf switches 304 in FIG. 3.

As previously mentioned, VTEPs 408C and 408D connect VMs A-H (404E-L), hosted on hosts 1 and 2 (406A and 406B), to the fabric 312. More specifically, VTEP 408C can connect VMs A-D (404E-404H) to the fabric 312, and VTEP 408D can connect VMs E-H (404I-L) to the fabric 312. Host 1 (406C) can host VMs A-D (404E-H) and host 2 (406D) can host VMs E-H (404I-L).

The VMs A-H can have a configured IP address, as well as a scope ID, such as a VNID, a VLAN ID, a VRF, a VSID, etc. In order to route traffic between the fabric 312 and the VMs A-H (404E-L), each host can maintain a respective forwarding table 502 and 504, which maps the VMs A-H (404E-L) to an IP address of the fabric 312, an IP address of the host, a subnet, and/or a network segment, such as a VNID or VLAN for example. Moreover, the entries in each of the forwarding tables 502 and 504 can be limited to the local entries for each of the hosts 406C-D and VTEPs 408C-D. For example, the forwarding table 502 of host 1 (106C) can include the entries of VMs A-D (404E-H), without including entries for the VMs in host 2, or any other host or external network. Similarly, the forwarding table 504 of host 2 (406D) can include the entries of VMs E-H (404I-L), without including entries for the VMs in host 1. This can ensure that VTEPs 408C-D can forward traffic to their local VMs, without having to include unnecessary entries that may potentially grow the size and complexity of the forwarding tables 502-504.

In addition, to allow VTEPs 408C-D to properly forward all other traffic (i.e., traffic intended for targets that are not local with respect to the host and VTEP), the forwarding tables 502 and 504 can also include a default route or "catch all" route in the table that points to a default forwarder function which can receive all non-local traffic and forward it appropriately towards the intended target or destination. The default forwarder function can be a forwarder function running on a device in the fabric 312. Thus, one or more switches or routers in the fabric 312 can implement the default forwarder function to receive traffic from the VTEPs 408C-D that is not intended for hosts 1 and 2, respectively, and handle the traffic by forwarding it as necessary. Accordingly, VTEPs 408C-D can use their respective forwarding tables 502 and 504 to forward local traffic intended to the local VMs, and send all other traffic back to the fabric 312 to the address in the forwarding tables 502 and 504 associated with the device in the fabric 312 running the default forwarding function.

As more VMs are removed or added to host 1, for example, the forwarding table 502 associated with host 1 can be updated to reflect such change. This way, the forwarding tables 502 and 504 can be maintained updated with respect to their local entries. However, any entry external to their respective hosts 1 and 2 can be ignored to prevent the forwarding tables 502 and 504 from growing in size and complexity. This way, the forwarding tables 502 and 504 can remain effective yet efficient and small.

FIG. 6 illustrates an example forwarding table 502 implementing a default forwarding function scheme. The forwarding table 502 can be implemented by host 1 (406C) and VTEP 408C, as illustrated in FIG. 5. As illustrated, the forwarding table 502 includes local entries 600, which correspond to the local VMs E-H.

Each of the local entries 600 can map the client address (CA), referring to the address of the VM, to the reachability information for that VM. The reachability information can include the physical address of the host or provider, the host ID, the network segment (e.g., VNID), and/or the routing domain ID. The reachability information in the local entries 600 can also specify whether the packet, when forwarded to the mapped address, needs to be encapsulated or decapsulated, and what encapsulation/decapsulation protocol should be implemented, such as VXLAN or NVGRE protocol, for example. This reachability information allows the VTEP 408C to receive a packet destined to any of the local VMs on host 1, and forward the packet as necessary to the appropriate physical address, host, network, domain, and so forth.

The forwarding table 502 can also include a default route 602 for all other traffic. The default route 602 creates an entry that maps all other traffic, which is defined by the asterisks to denote traffic addressed to any other destination, to a forwarder function. The forwarder function can be used to properly handle all other traffic, including traffic intended to any other hosts, VMs, or servers in the overlay network 400. For example, an incoming packet destined to VM E (404I) on host 2 and VNID 3, would fall within the scope of the default route 602 and thus would be directed to the device running the default forwarder function. Thus, the incoming packet would be forwarded to the device running the default forwarder function, which would forward the incoming packet on to VM E (404I) at host 2 and VNID 3.

In some cases, the default forwarding function is implemented by the switches 302 and/or 304 in the fabric 312. Accordingly, the default route 602 can map all other traffic to the switches 302 and/or 304 in the fabric 312, for handling by those switches using the default forwarder function as previously mentioned.

The default route 602 can also include any necessary encapsulation/decapsulation information. For example, if the default route 602 maps to a location which requires the incoming packets to traverse a virtual tunnel, then it can include the necessary encapsulation information to allow the incoming packets to be encapsulated to traverse the virtual tunnel. The encapsulation/decapsulation information can include the specific protocol implemented for encapsulation/decapsulation, such as VXLAN or NVGRE, for example.

In some embodiments, the forwarding table 502 can include more than one default route for redundancy. Moreover, the default route 602 can also be split into multiple default routes. For example, if the default forwarder function is implemented in various devices, multiple default routes can be created in the forwarding table 502 where specific ranges or types of traffic are designated to a default forwarder function device, and other ranges or types of traffic are designated to another default forwarder function device.

Furthermore, while forwarding table 502 is shown as including local entries for local traffic and a default route for any other traffic, some embodiments of the forwarding table 502 can include non-local entries for specific destinations and/or types of traffic. For example, the forwarding table 502 can include non-local entries for a specific tenant, service, VNID, VLAN, device, and so forth. Moreover, the forwarding table 502 can also include other information, such as topology information, metrics, routing protocols, other static routes, priorities, gateways, hop information, paths and associated hops, subnets, rules, etc.

Figure 7:
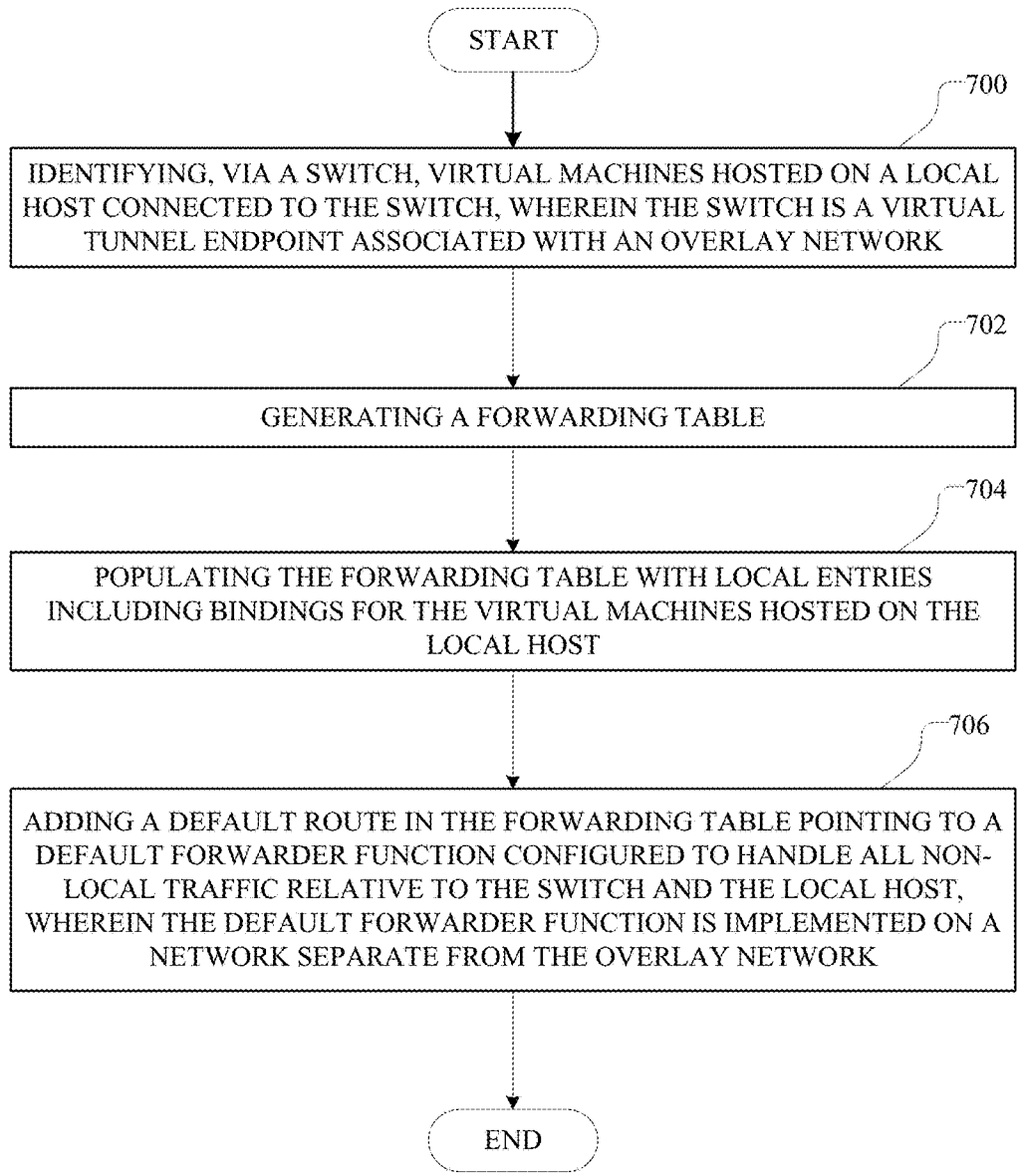
FIG. 7 illustrates an example method embodiment.

Having disclosed some basic system components and concepts, the disclosure now turns to the exemplary method embodiment shown in FIG. 7. For the sake of clarity, the method is described in terms of a system 110, as shown in FIG. 1, configured to practice the method. The steps outlined herein are exemplary and can be implemented in any combination thereof, including combinations that exclude, add, or modify certain steps.

The system 110 first identifies virtual machines hosted on a local host connected to the system 110, wherein the system 110 is a virtual tunnel endpoint associated with an overlay network (700). The virtual machines can reside on one or more segments of the overlay network, such as VNIDs or VLANs. In some cases, the overlay network can be a VXLAN network. However, as one of ordinary skill in the art will readily recognize, the overlay network can be based on any overlay protocol. The local host can be a server connected to the system 110 and running the virtual machines. For example, the local host can be a server running a hypervisor with one or more virtual machines. Here, the virtual machines can reside on the overlay network.

In identifying the virtual machines, the system 110 can obtain any of the routing information of the virtual machines, which can include, for example, the IP address of the virtual machines, the IP address of the local host, the MAC address of the local host, the network and/or network segment identifier (ID), a routing domain ID, etc. The system can also compare routing information collected with its own configured networking information, such as subnet, IP address, network segment, routing domain, etc., to determine if the routing information should be treated as local for purposes of the forwarding policy, as described below.

Next, the system 110 generates a forwarding table (702). The forwarding table can be a lookup table used by the system 110 to route or forward packets it receives. To this end, the system 110 can use the forwarding table to determine where to send an incoming packet it receives. In other words, the forwarding table can help the system 110 identify the next hop for the packet. Accordingly, the forwarding table can have hop information and mappings or bindings.

The system 110 then populates the forwarding table with local entries including bindings for the virtual machines hosted on the local host (704) and adds a default route in the forwarding table pointing to a default forwarder function configured to handle all non-local traffic relative to the system 110 and the local host, wherein the default forwarder function is implemented on a network separate from the overlay network (706). Thus, the system 110 can include all of the local entries in the forwarding table and a default route for all other traffic. This way the system 110 can maintain a smaller and less complex forwarding table, by limiting the table to local entries and a "catch all" or default route for all other addresses and devices.

As the network, the fabric, and the overlay network grows, the system 110 can maintain forwarding tables as described above, without adding a great deal of unnecessary entries and complexity. Moreover, system 110 does not need to maintain entries for other hosts or remote virtual machines, and the network and networking devices do not need to converge routing information, which could further add to the burden on the network and complexity of the routing or forwarding tables.

The system 110 can add and delete local entries as local virtual machines are added or removed from the local host. For example, if a local virtual machine is migrated to another host and/or network segment, the local entry of that virtual machine can be removed from the forwarding table. On the other hand, the update can also be pushed to the hosts or hypervisors affected by the changes, which would allow those hosts or hypervisors to update their forwarding table accordingly. The other hosts or hypervisors can similarly implement the forwarding policy described above.

The network fabric can include spine and leaf switches, such as fabric 312 illustrated in FIG. 3. One or more of the spine and leaf switches can implement the default forwarder function, to allow non-local traffic forwarded from the system 110 (or any other VTEP or switch implementing the forwarding policy) to be routed to the next hop. In some cases, the default forwarder function can be implemented in a distributed fashion, such that multiple switches in the fabric 312 can implement the functionalities. The leaf and spine switches can obtain the VM-to-host reachability information by learning such information from the data plane or using a scalable control plane, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

We claim:

1. A method comprising:
identifying virtual machines hosted on a local host associated with a switch component comprising a virtual tunnel endpoint associated with an overlay network;
generating, via a processor, a forwarding table for the switch component and populating the forwarding table only with local entries comprising bindings or entries for the virtual machines hosted on the local host;
adding a default route in the forwarding table pointing to a forwarder function configured to handle all non-local traffic relative to the switch component, wherein the forwarder function associated with the default route is implemented on a network separate from the overlay network; and
updating the forwarding table only based on updates to the virtual machines hosted on the local host or addition of new virtual machines hosted on the local host.

2. The method of claim 1, wherein the switch component is hosted by the local host, and wherein the switch component comprises one of a virtual switch or a virtual router.

3. The method of claim 1, wherein each of the local entries comprises a respective virtual machine address and a respective network scope identifier.

4. The method of claim 1, wherein the non-local traffic comprises traffic having a destination that is not hosted by the local host.

5. The method of claim 1, wherein the local entries comprise respective network segment identifiers, wherein the respective network segment identifiers comprise at least one of overlay segment identifiers, virtual local area network identifiers, and virtual routing and forwarding identifiers.

6. The method of claim 1, wherein the network comprises a network fabric connected to the overlay network, wherein the forwarder function resides on the network fabric, the switch component connecting the network fabric to the overlay network.

7. The method of claim 6, wherein the virtual machines reside in the overlay network and communicate with the network fabric via a tunnel provided by the switch component, wherein the overlay network comprises a virtual extensible local area network (VXLAN).

8. The method of claim 6, wherein the default route is used to route traffic intended to other virtual machines in the overlay network, the other virtual machines being hosted by other hosts.

9. The method of claim 6, wherein the network fabric comprises spine and leaf network devices in a spine and leaf topology, wherein the forwarder function is hosted or performed by a plurality of the spine and leaf network devices.

10. The method of claim 1, further comprising removing a local entry from the forwarding table associated with a virtual machine on the local host when the virtual machine is at least one of migrated to another host or removed from the local host.

11. The method of claim 1, further comprising adding a local entry to the forwarding table associated with a virtual machine on the local host when the virtual machine is at least one of added to the local host or migrated from another host to the local host.

12. A system comprising:
one or more processors; and
a computer-readable storage medium having stored therein instructions which, when executed by the one or more processors, cause the one or more processors to perform operations comprising:
identifying virtual machines hosted on a local host associated with a switch, the switch comprising a virtual tunnel endpoint associated with an overlay network;
generating a forwarding table for the switch and populating the forwarding table only with local entries comprising bindings or entries for the virtual machines hosted on the local host;
adding a default route in the forwarding table pointing to one or more devices running a forwarder function, wherein the forwarder function is configured to handle all non-local traffic relative to at least one of the switch and the local host; and
updating the forwarding table only based on updates to the virtual machines hosted on the local host or addition of new virtual machines hosted on the local host.

13. The system of claim 12, wherein the execution of the instructions stored on the computer-readable storage medium further cause the one or more processors to update the forwarding table by updating the local entries in the forwarding table when a local virtual machine is migrated to the local host, added to the local host, or removed from the local host.

14. The system of claim 12, wherein the switch comprises a virtual switch, the non-local traffic comprising traffic having a destination that is not hosted by the local host.

15. The system of claim 12, wherein the local entries include at least one of respective addresses associated with local virtual machines, respective network segment identifiers associated with the local virtual machines, and an address associated with the local host hosting the local virtual machines.

16. The system of claim 12, wherein the execution of the instructions stored on the computer-readable storage medium cause the one or more processors to update the forwarding table only when a virtual machine is added to the local host or removed from the local host, and wherein updates to other forwarding tables associated with different hosts or switches are not propagated to the forwarding table unless such updates are associated with the virtual machine being added to the local host or removed from the local host.

17. A non-transitory computer-readable storage medium having stored therein instructions which, when executed by a processor, cause the processor to perform operations comprising:
receiving, via a switch comprising a virtual tunnel endpoint connected to an overlay network, an incoming packet intended for a destination address;
analyzing a forwarding table to identify a next hop for the packet, wherein the forwarding table comprises only local entries for local destinations relative to the switch and a default route entry for all non-local traffic, the local destinations corresponding to virtual nodes hosted on a same host as the switch and wherein the forwarding table is updated only based on updates to the virtual nodes hosted on the same host or addition of new virtual nodes hosted on the same host; and
forwarding the incoming packet to the next hop based on an entry in the forwarding table, the entry comprising:
at least one of the local entries when the next hop is one of the virtual nodes hosted on the same host as the switch; or
the default route entry when the next hop is not one of the virtual nodes hosted on the same host as the switch.

18. The non-transitory computer-readable storage medium of claim 17, wherein the virtual tunnel endpoint connects the virtual nodes hosted on the same host to a network fabric via a tunnel between the overlay network and the network fabric, wherein the default route entry corresponds to one or more nodes in the network fabric.

19. The non-transitory computer-readable storage medium of claim 17, wherein the default route entry maps to a forwarder function implemented by a plurality of network devices on the network fabric, and wherein the plurality of network devices comprises at least one of spine and leaf switches on the network fabric.

20. The non-transitory computer-readable storage medium of claim 17, wherein the virtual nodes hosted on the same host as the switch are associated with a plurality of virtual network domains comprising different overlay network segments.

* * * * *